INVENTOR
BOYD T. AYDELOTT
BY Semmes & Semmes
ATTORNEYS

June 20, 1967  B. T. AYDELOTT  3,326,354
BELT CONVEYOR

Filed March 15, 1965  5 Sheets-Sheet 3

INVENTOR
BOYD T. AYDELOTT
BY Semmes & Semmes
ATTORNEYS

June 20, 1967   B. T. AYDELOTT   3,326,354
BELT CONVEYOR

Filed March 15, 1965   5 Sheets-Sheet 4

INVENTOR
BOYD T. AYDELOTT
BY Semmes & Semmes
ATTORNEYS

June 20, 1967   B. T. AYDELOTT   3,326,354
BELT CONVEYOR

Filed March 15, 1965   5 Sheets-Sheet 5

INVENTOR
BOYD T. AYDELOTT

BY Semmes & Semmes
ATTORNEYS

United States Patent Office 3,326,354
Patented June 20, 1967

3,326,354
BELT CONVEYOR
Boyd T. Aydelott, Indian Rocks Beach, South Shore, Fla., assignor of forty-five percent to John Dudley, Dunedin, Fla., and forty-five percent to Roberta C. Aydelott, Clearwater, Fla.
Filed Mar. 15, 1965, Ser. No. 439,620
7 Claims. (Cl. 198—184)

This invention concerns apparatus for conveying semi-fluid materials on a flexible belt. Disclosed herein is apparatus for continuously shaping a belt into a tube, opening the tube-shaped belt, depositing semi-fluid materials within the belt, enclosing and lifting the materials, and uniformly opening the belt to release the materials.

In building construction, a great need has evolved for apparatus capable of raising semi-fluid concrete from transit-mix trucks to elevated hoppers so that the concrete may be distributed over upper stories of buildings under construction. Heretofore, lifting operations have employed cranes to repeatedly lift concrete in open buckets or elevators to raise and lower laborer-operated carts. However, those methods have several disadvantages, among which are slow, non-continuous operations and the added building costs of employing a crane and skilled operator or additional laborers.

Conveyors have unsuccessfully been used for raising concrete. Bucket conveyors require relatively heavy equipment for low capacities; continuous surface conveyors are incapable of lifting fluid materials at varied angles from the horizontal. Frictional losses in tube conveyors engender great power losses.

The present invention avoids major frictional losses by providing a continuously moving tube, which is tightly closed to contain concrete at near vertical orientation, and which is fully opened to release the material at the end of its traverse.

Accordingly, one object of this invention is the provision of a continuous conveyor for lifting semi-fluid materials.

One other object of this invention is the provision of a belt conveyor for concrete.

Another object of this invention is the provision of a tube-belt conveyor which selectively may be closed tightly and may be opened fully.

A further object of the invention is the provision of apparatus for uniformly forming a tube from a belt, for opening and closing the tube, and for moving the belt.

Further objects of the invention will be apparent from the sepecification and from the drawings in which:

FIGURE 7 is an elevation of a modification of the conveyor having a turned delivery end to allow vertical operation of the conveyor;

Figure 1:
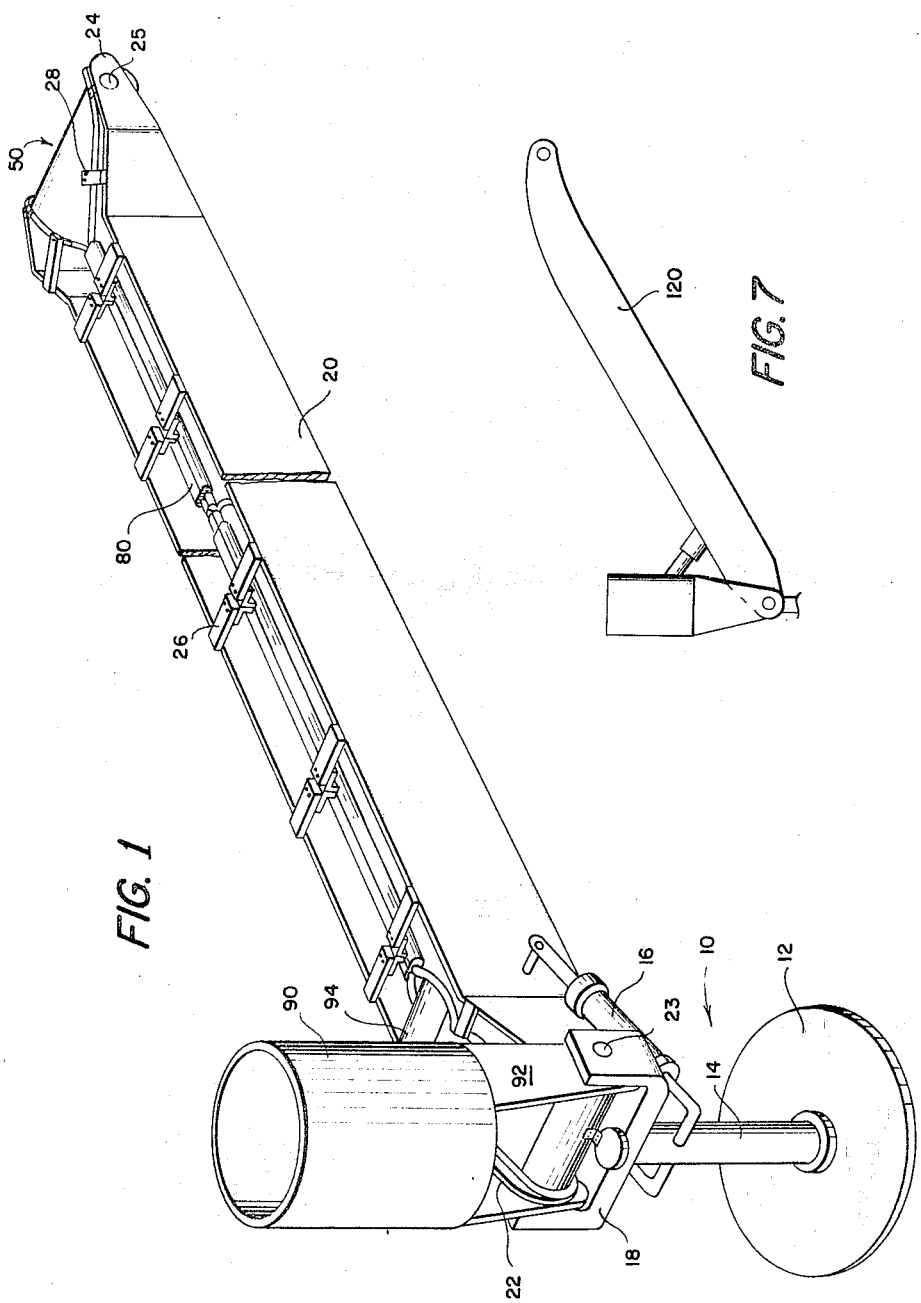
FIGURE 1 is a perspective view of an assembled conveyor.

Referring to FIGURE 1, a standard is generally indicated by the numeral 10. Standard 10 may be considered to represent a trailer body or a truck frame, as shown in my co-pending patent application Ser. No. 245,178. Base 12 rotatably supports a vertical column 14, which pivots one end of an extensible hydraulic actuator 16, and which mounts yoke 18. Lower end 22 of conveyor frame 20 is pivoted on shaft 23, which is held by yoke 18. Free end 24 of conveyor frame 20 rotatably supports shaft 25. Cross members 26 and mountings 28 are fixed transversely along the frame.

Figure 2:
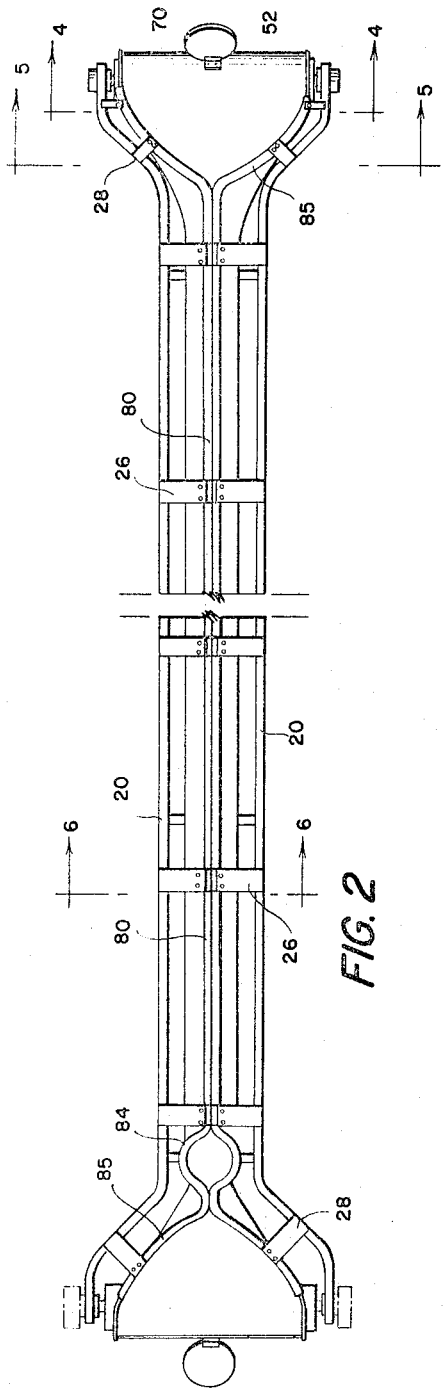
FIGURE 2 is a plan view of the conveyor shown in FIGURE 1.
Figure 3:
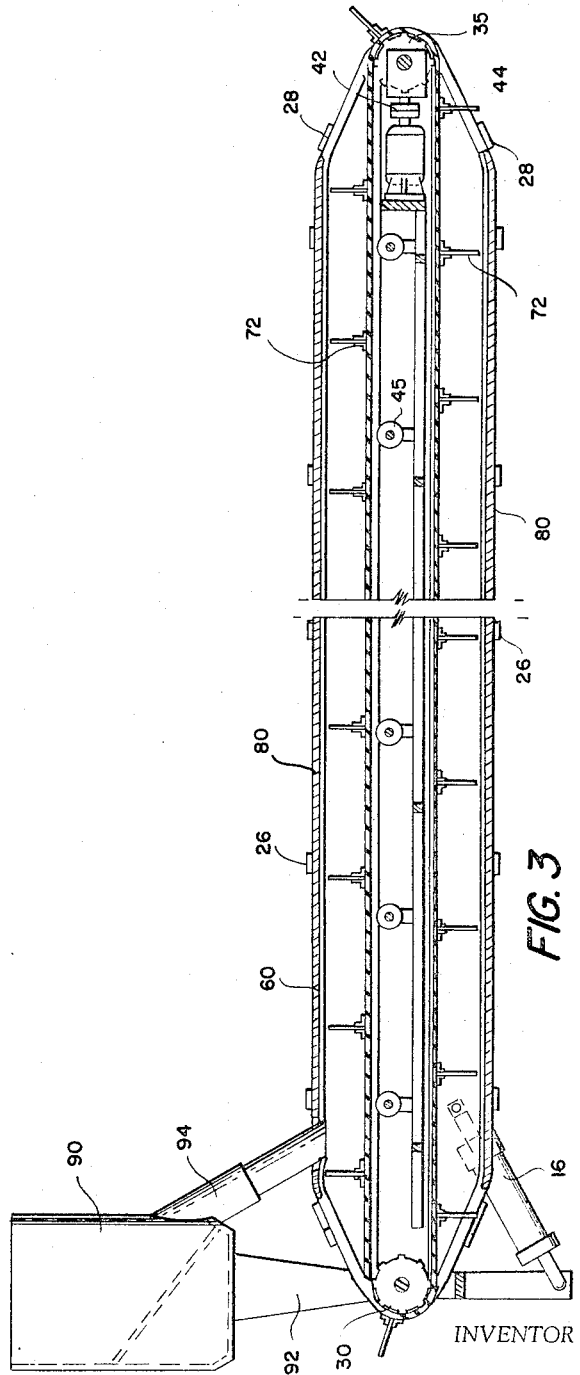
FIGURE 3 is a sectional elevation of the conveyor shown in FIGURES 1 and 2.

Referring to FIGURES 2 and 3, rollers 30 and 35 are rotated respectively on shafts 23 and 25. Motor 41 drives roller 35 through clutch 42 and gear box 43. A plurality of wheels 45, which are connected to frame 20 partially support and guide moving belt 50.

Figure 4:
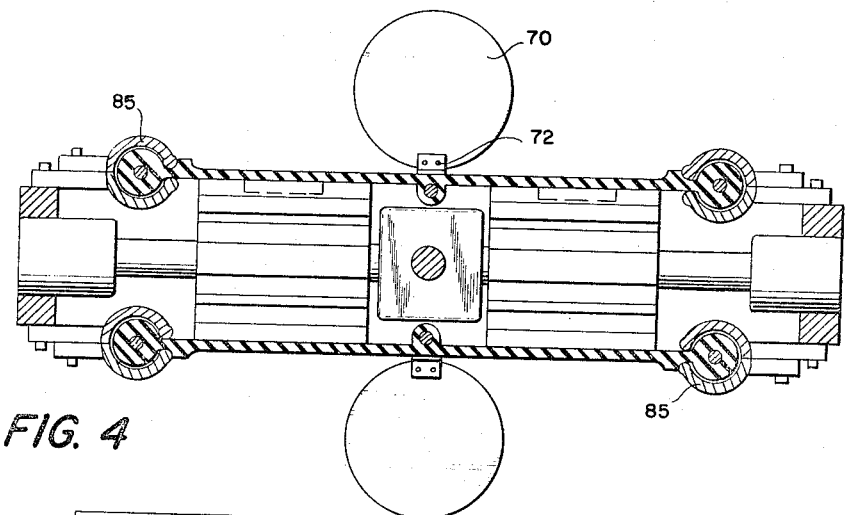
FIGURE 4 is a section of the fully opened conveyor belt taken along line 4—4 of FIGURE 2.
Figure 5:
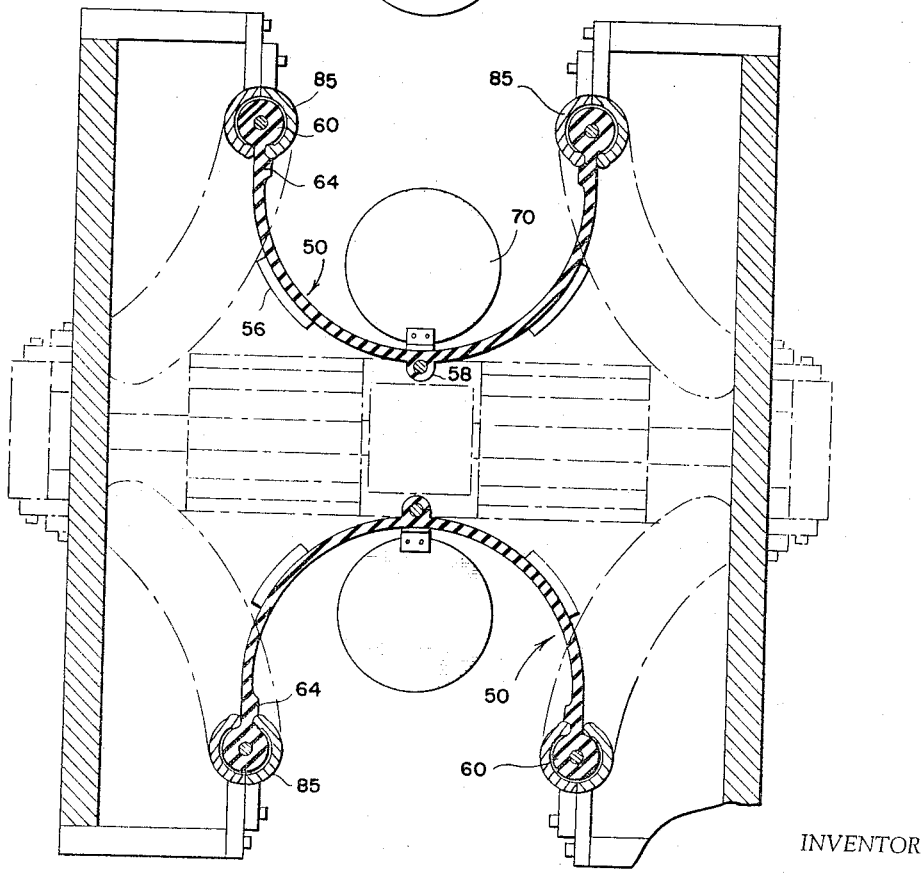
FIGURE 5 is a section of the conveyor belt in its partially opened configuration, taken along line 5—5 of FIGURE 2.
Figure 6:
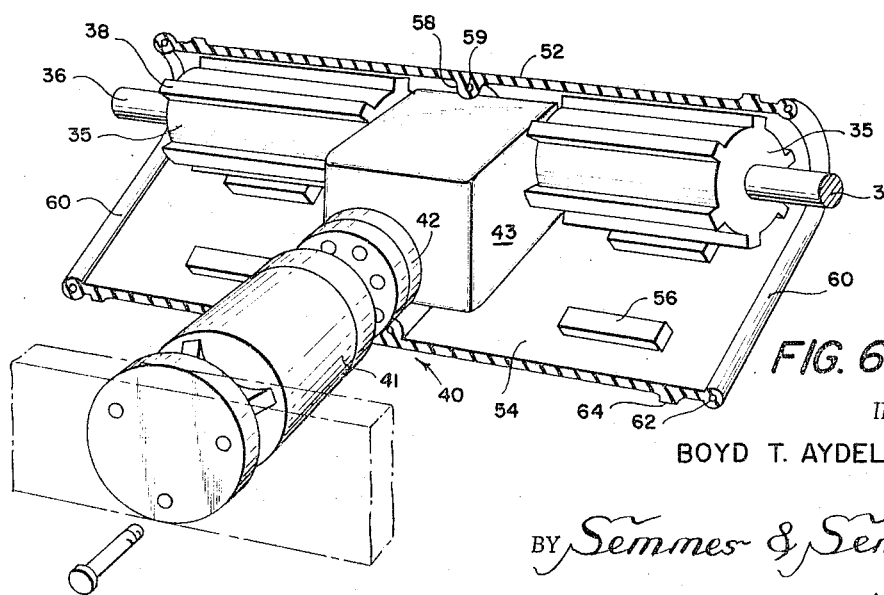
FIGURE 6 is a detail of the conveyor drive, showing its relationship to an open belt.

Elements of belt 50 are best shown in FIGURES 4 through 5 and in FIGURE 6. Face 52 supports concrete being conveyed, and back 54 mounts a plurality of spaced driving lugs 56. Cable 59 is enclosed integrally in an enlarged portion on the back of the belt. In a like manner, opposite belt edges 60 enclose cables 62. As belt 50 is flattened for emptying, spill beads 64 prevent concrete from seeping into guides 80 and 85.

Paddles 70 partition tube-shaped belt 50 into sections to ensure against back sliding of the enclosed material. Additionally, paddles 70 assist in shaping the belt in circular cross section. Paddle mountings 72 are secured to working face 52 of the belt and to central cable 59. Preferably, the entire belt 50, including paddle assembles 70 and cables 59 and 62, is divided transversely into 10 feet interlocking segments. Thus, individual worn segments may be replaced, and the belt may be increased in length.

Guides 80, supported on frame spanning cross members 26, support tube-shaped belt 50 by firmly engaging edges 60. Rounded lips 81 of guides 80 press firmly against the belt, ensuring sealing of mutually opposed spill beads 64. Adjacent opposite ends of the conveyor guides 80 separate into individual guides 85 which uniformly separate opposite edges of the belt, orienting the belt in planar configuration. The function of guides 85 is best shown in FIGURES 4 and 5. Support members 28 position single guides 85 with respect to frame 20.

Returning to FIGURES 1, 2 and 3, guides 84 create a circular opening in the tube adjacent the lower end of the conveyor. Hopper 90, which is supported by legs 92 on yoke 18, deposits concrete into the belt through telescoping chute 94.

FIGURE 7 illustrates a modification of the conveyor frame. The upper end of frame 120 has been turned so that the opening of the belt is effected in a generally horizontal plane.

In operation, motor 41 drives belt 50 through roller 35. After portions of the belt pass over roller 30 in a flattened configuration, converging guides 85 lift edges of the belt upwardly and shape the belt about circular paddles 70 into a tube. Guides 84 continuously open portions of the tube, and concrete is deposited therein from hopper 90 through chute 94. The tube-shaped belt continues onward supported from overhead by guides 80 and from beneath by wheels 45.

Adjacent the upper end of the conveyor diverging guides 85 separate belt edges 60, opening the belt, which releases concrete over the top of roller 35. The belt may be formed into a tube when returning to lower roller 30 for repetition of the continuous process of forming, filling, conveying and emptying.

It is important that belt edges 60 be enclosed in continuous guides 80 and 85 in order that lubrication be maintained and to prevent exposure of the bearing edges to contaminants. As an alternative, upper and lower guides 80 may be laterally offset so that the returning belt may travel beside the advancing belt rather than beneath the advancing belt as shown in the drawings. If space conservation is unnecessary, the belt may return flattened. Grease may be added to guides 80 and 85, or lubricating soap may be applied to belt edges 60 to facilitate movement within guides 80 and 85.

Frame 20 together with guides 80 preferably are constructed in five feet interlocking lengths so that additional sections may be added to satisfy lifting requirements.

Figure 8:
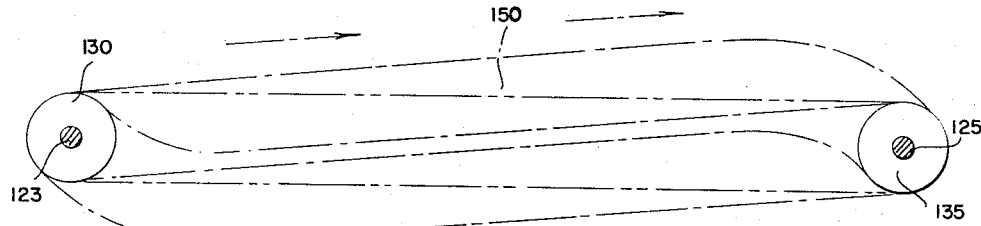
FIGURE 8 is a schematic of spacial relationship between rollers and belt.

In order to provide smooth operation while maintaining the belt in tension, guides are offset from the plane of rollers 130 and 135 as shown in FIGURE 8. Consequently, in each complete revolution, edges of the belt travel the same distance as its center.

Figure 9:
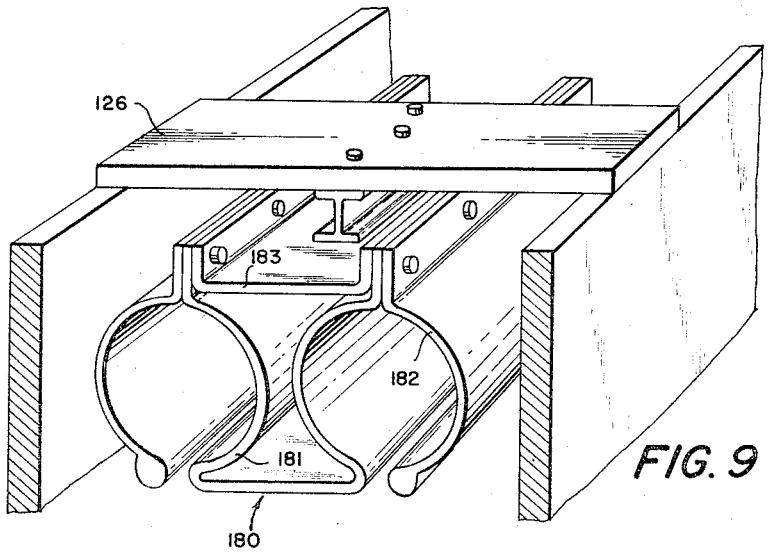
FIGURE 9 is a detail of a preferred double guide assembly.

Preferred double guides are illustrated in FIGURE 9. Central section 181 comprising opposed semi cylinders is bolted to outer sections 182 and channel iron 183. The entire double guide assembly is suspended from cross bars 126.

Figure 10:
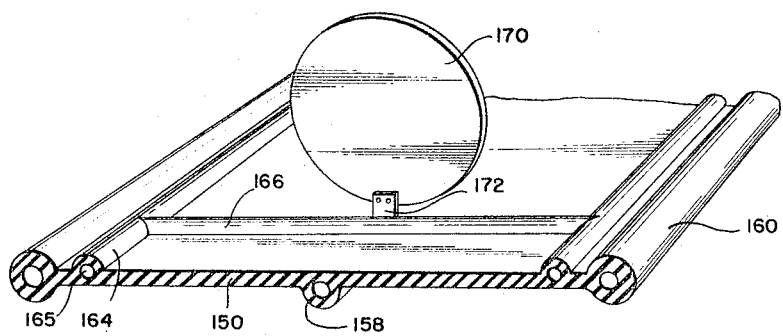
FIGURE 10 is a detail of a preferred belt.

A detail of an alternate, preferred, form of the belt is shown in FIGURE 10. Belt 150 defines depressed portions 153 adjacent opposite lateral edges 160 to facilitate bending when the belt is urged into tubular form. Raised semi-cylindrical spill beads 164 surround voids 165 to prevent lateral flow of conveyed materials and to seal the belt in its tubular configuration. The primary seal, it will be appreciated, is effected by contact of the respective edges of the belt 150 with the separate conveyor guides 181 and 182. That is to say the weight of the conveyed material upon the guides through the parallel and spaced edges, causes the initial and primary seal. The secondary sealing, however, is effected by the spill beads 164 which are in juxtaposition, but not actually contacting, during the course of movement of the conveyor through the spaced guides 181 and 182. The function of the spill beads is simply to retard the flow of the heavy conveyed mix into the guide area, thus preventing any abrasive and deteriorative effect on the smooth running of the belt edges within the respective guides. Noteworthy is the fact that by this system, the conveyed material thus moves without friction, as the material itself is devoid of contact with either of the guides. It is solely in contact with the belt and is immovable with respect to said belt, after loading and before dispensing. Paddle backing beads 166 are formed integrally and transversely on the belt to provide circumferential support to paddle 170 when the belt is rolled into the tube. Concrete loaded in a pocket formed between adjacent paddles pushes against the lower paddle which rests against bead 166.

Although this invention has been described by specific example, it will be obvious to one skilled in the art that modifications may be made without departing from the teachings of the disclosure. The precise scope of the invention is defined only in the appended claims.

I claim:
1. A conveyor for semi-fluid materials comprising:
 (A) an elongated frame;
 (B) first and second parallel rollers, journalled at opposite longitudinal ends of said frame;
 (C) a continuous flexible belt, partially surrounding said rollers and contacting same; said belt having:
  (C1) enlarged opposite lateral edges;
  (C2) a back partially engaging said rollers and extending between said lateral edges;
  (C3) a face opposite said back, said face being coextensive with and bounded by said lateral edges;
  (C4) a plurality of paddles transversely oriented on said face and spaced along the center-line of said belt;
  (C5) opposite spill beads extending longitudinally on said face intermediate of said lateral edges;
 said elongated frame including . . .
  (A1) double belt-holding guides, slideably engaging the respective edges of the belt in a tube forming parallel edge relation; intermediate of said rollers and adjacent said roller zones, said holding guides diverging from each other adjacent the zones defined by the respective rollers, opening thereby the flexible belt in said zones for respectively loading and dispensing the semifluid materials.

2. A conveyor of claim 1 in which the frame also includes plural truss means, engaging the guides exteriorly thereof to position the guides in a belt surrounding disposition during movement of said belt.

3. Apparatus of claim 1 additionally comprising a longitudinal medial bead integrally formed on said belt back, and a plurality of guide wheels mounted on said frame between back running portions of the belt, guiding said medial beads, and supporting said belt against distortion due to slack in the returning portion of the belt.

4. The conveyor of claim 1 wherein said belt additionally comprises depressed longitudinal portions adjacent said spill beads.

5. The conveyor of claim 1 wherein said spill beads comprise raised double walled semi-cylinders defining with said belt a void.

6. The conveyor of claim 1 wherein said belt additionally comprises a plurality of paddle backing beads integrally formed transversely on the belt intermediate spill beads and adjacent respective paddles, said backing beads lying contiguous the backing portion of respective paddles to sustain same against deformation during conveyance of the loaded materials.

7. The conveyor of claim 1 wherein said double edge guides comprise:
 a center section defining opposite semi cylinders, and first and second opposed semi-cylinders mounted on said center section and defining therebetween belt receiving openings.

References Cited

UNITED STATES PATENTS

| | | | |
|---|---|---|---|
| 1,427,553 | 8/1922 | Schwinger | 198—191 |
| 2,199,935 | 5/1940 | Johns | 198—59 |
| 2,937,538 | 5/1960 | Worral | 198—203 |
| 2,966,254 | 12/1960 | Kaiser | 198—201 |
| 2,998,121 | 8/1961 | Gilbert | 198—201 |
| 3,164,238 | 1/1965 | McCullagh | 198—201 |

FOREIGN PATENTS

| | | |
|---|---|---|
| 1,356,185 | 2/1964 | France. |
| 887,698 | 1/1962 | Great Britain. |
| 42,531 | 2/1938 | Netherlands. |

EVON C. BLUNK, *Primary Examiner.*

RICHARD E. AEGERTER, *Examiner.*

UNITED STATES PATENT OFFICE
CERTIFICATE OF CORRECTION

Patent No. 3,326,354　　　　　　　　　　　　June 20, 1967

Boyd T. Aydelott

It is hereby certified that error appears in the above numbered patent requiring correction and that the said Letters Patent should read as corrected below.

In the heading to the printed specification, line 4, for "John Dudley" read -- John Dudley Crutcher --.

Signed and sealed this 25th day of June 1968.

(SEAL)
Attest:

Edward M. Fletcher, Jr.　　　　　　　　　　　EDWARD J. BRENNER
Attesting Officer　　　　　　　　　　　　　　Commissioner of Patents